(12) United States Patent
Koo et al.

(10) Patent No.: US 8,209,252 B1
(45) Date of Patent: *Jun. 26, 2012

(54) METHOD OF AND SYSTEM FOR PROTECTING AN INITIAL INVESTMENT VALUE OF AN INVESTMENT

(75) Inventors: Samson Koo, Scarsdale, NY (US); Stephen Douglas, Houston, TX (US)

(73) Assignee: Barclays Bank PLC (GB)

( * ) Notice: Subject to any disclaimer, the term of this patent is extended or adjusted under 35 U.S.C. 154(b) by 798 days.

This patent is subject to a terminal disclaimer.

(21) Appl. No.: 12/323,181

(22) Filed: Nov. 25, 2008

Related U.S. Application Data

(63) Continuation of application No. 11/851,292, filed on Sep. 6, 2007, now Pat. No. 7,475,033, which is a continuation-in-part of application No. 11/847,167, filed on Aug. 29, 2007, now Pat. No. 7,472,086.

(51) Int. Cl.
*G06Q 40/00* (2012.01)
(52) U.S. Cl. .................................................... 705/36 R
(58) Field of Classification Search ................. 705/36 R
See application file for complete search history.

(56) References Cited

U.S. PATENT DOCUMENTS 5,884,286 A * 3/1999 Daughtery, III ............ 705/36 R
(Continued)

FOREIGN PATENT DOCUMENTS

WO   WO 98/41941   9/1998

OTHER PUBLICATIONS

Anonymous, "Gold Options and Futures Hedge Mining Investment for RIC", Journal of Taxation and Regulation of Financial Institutions, Brooklyn: Nov./Dec. 2004.*

(Continued)

*Primary Examiner* — Olabode Akintola
(74) *Attorney, Agent, or Firm* — Amster, Rothstein & Ebenstein LLP

(57) ABSTRACT

A method of protecting at least a portion of an initial investment value of an investment made by one or more investors, comprising the steps of: (a) determining using an option-based instrument calculator: (i) a first value of a first set of put option-based instruments at initial investment in the first set of put option-based instruments, the first set of put option-based instruments having a first underlying reference; (ii) a second value of a first set of call option-based instruments at initial investment in the first set of call option-based instruments, the first set of call option-based instruments having a second underlying reference, the first underlying reference being the same as or substantially correlated to the second underlying reference; and (iii) a third value of a second set of option-based instruments at initial investment in the second set of option-based instruments, the second set of option-based instruments having a third underlying reference; so that the sum of the first value, the second value, and the third value is less than the initial investment value; (b) holding positions using a regulated investment company in the first set of put option-based instruments, the first set of call option-based instruments, and the second set of option-based instruments, so that the first set of put option-based instruments and the first set of call option-based instruments provide the at least a portion of the initial investment value at maturity of the investment; and (c) making available the at least a portion of the initial investment value to the one or more investors upon the maturity of the investment.

16 Claims, 2 Drawing Sheets

U.S. PATENT DOCUMENTS

| | | |
|---|---|---|
| 2001/0042036 A1 | 11/2001 | Sanders |
| 2003/0018571 A1 | 1/2003 | Eckert et al. |
| 2003/0093347 A1 | 5/2003 | Gray |
| 2003/0115128 A1 | 6/2003 | Lange et al. |
| 2004/0002913 A1 | 1/2004 | Breen et al. |
| 2004/0019555 A1 | 1/2004 | Lara |
| 2004/0153388 A1 | 8/2004 | Fisher et al. |
| 2004/0210503 A1 | 10/2004 | Marshall |
| 2005/0086148 A1 | 4/2005 | Woodruff et al. |
| 2005/0108148 A1 | 5/2005 | Carlson |
| 2005/0131798 A1 | 6/2005 | Eisler et al. |
| 2005/0182702 A1 | 8/2005 | Williams, III |
| 2005/0192889 A1 | 9/2005 | Sauter et al. |
| 2005/0234797 A1* | 10/2005 | Schwartz .................. 705/36 |
| 2005/0262010 A1 | 11/2005 | Tull, Jr. et al. |
| 2006/0010056 A1 | 1/2006 | De La Motte |
| 2006/0100948 A1 | 5/2006 | Millien et al. |
| 2006/0100950 A1 | 5/2006 | Hecht |
| 2006/0143099 A1 | 6/2006 | Partlow et al. |
| 2006/0155638 A1 | 7/2006 | de la Motte |
| 2006/0212380 A1 | 9/2006 | Williams et al. |
| 2006/0218075 A1 | 9/2006 | Feldman et al. |
| 2006/0253354 A1 | 11/2006 | O'Callahan |
| 2006/0282356 A1 | 12/2006 | Andres et al. |
| 2007/0016497 A1 | 1/2007 | Shalen et al. |
| 2007/0033128 A1 | 2/2007 | McNair |
| 2007/0061228 A1 | 3/2007 | Hecht |
| 2007/0061236 A1 | 3/2007 | Papadakis et al. |
| 2007/0118450 A1 | 5/2007 | Hawkes et al. |
| 2007/0118457 A1 | 5/2007 | Peterffy et al. |
| 2007/0156563 A1 | 7/2007 | McGill |

OTHER PUBLICATIONS

Rocap et al., "The Mixed-up World of Pseudo Passthroughs/Comment on Pseudo Passthroughs", Taxes, Riverwoods, Mar. 2007).*

L.A. Barroso, H. Rudnick, R. Moreno and B. Bezerra, "Ensuring Resource Adequacy with Auctions of Options and Forward Contracts," IEEE, Jun. 2007, pp. 1-6.

H. Zhang and M. C. Fu, "Applying Model Reference Adaptive Search to American-Style Option Pricing," IEEE, Jul. 2006, pp. 711-714, 2006 Winter Simulation Conference.

Z. Zhu and F.B. Hanson, "A Monte-Carlo Option-Pricing Algorithm for Log-Uniform Jump-Diffusion Model," IEEE, Sep. 2005, pp. 5221-5226, 44th IEEE/European Conference 2005.

J. Chen, "Simulation-based Pricing of Mortgage-Backed Securities," 2004 Winter Simulation Conference, 7 Sheets, R.G. Ingalls, M.D. Rossetti, J.S. Smith, & B.A. Peters.

T. Kaino and K. Hirota et al., "Differentiation of Nonnegative Measurable Function Choquet Integral . . . ", IEEE, 1999, pp. III-73-III-78.

F. Mizoguchi and H. Ohwada et al., "A constraint-oriented Decision Support System for Option-based Investment Strategies," IEEEE, Jun. 1991, pp. 146-151.

M. A. Miller, "Hedging Strategies for Protecting Appreciation in Securities and Portfolio," Journal of Financial Planning, Aug. 2002, pp. 64-72, vol. 15,8.

B. A. Eales and R. Tunaru, "Financial Engineering Applications of Forward Start Options . . . ," Journal of Structured Finance, Fall 2006, 6 sheets, New York, vol. 12,3.

J. Mannion, "Capital idea for inventors who don't want to risk their funds," The Express, Nov. 3, 2004, 3 Sheets, 2007 Factiva, Inc.

The Wall Street Journal, "Brokerage Houses Use Options to Profit From Short Positions," Mar. 11, 1982, 2 Sheets, 2007 Factiva, Inc.

R. Turchansky, Advisers switch gears to let retirees spend: 'It's almost a 30-7ear bear market you're looking at', Edmonton Journal, Nov. 1, 2006, 3 Sheets, 2007 Factiva, Inc.

S. Anac and M. Gozen, "An analytical approach to develop hedging strategies for mining companies," Trans. of the Instit. of Mining & Metallurgy, Aug. 2003, 1 Sheet, vol. 112.

A. Pelsser, "Pricing and hedging guranteed annuity options via static option replication," Math and Economics, 2003, p. 283-296, vol. 33.

L. Vacca, PhD., "Managing options risk with genetic algorithms," Jan. 30, 1997, p. 29-35.

Engineering Village, Search History, indexed by Inspec., 5 Sheets.

P. P. Boyle, M. R. Hardy et al., "Reserving for maturity guarantees: Two approaches," Math and Economics, 1997, pp. 113-127, vol. 21.

T. F. Coleman, Y. Li, M-C. Patron, "Hedging guarantees in variable annuities under both equity and interest rate risk," Math and Economics, 2006, p. 215-228, vol. 38.

Y. Oum, S. Oren, S. Deng, "Hedging Quantity Risks with Standard Power Options . . . ," Wiley Periodicals, Inc. Naval Research Logistics, 2006, pp. 697-712, vol. 53.

M. A. Milevsky, T.S. Salisbury, "Financial valuation of guaranteed minimum withdrawal benefits," Math and Economics, 2006, pp. 21-38, vol. 38.

Citigroup Inc., "Safety First Trust Series 2007-3," Citigroup Funding Inc., Jun. 25, 2007, pp. 1-90, SEC Filing.

Citigroup Funding Inc. and Citigroup, Inc., "Equity First Protection First," Saftey First Trust Series 2007-3, pp. 1-24, SEC Filing.

Citigroup Funding Inc. and Citigroup, Inc., "Form S-3 Registration Statement . . . ," Jul. 19, 2006, pp. 1-104, SEC Filing.

Citigroup Funding Inc., "Index Warrants, Series W-A," Prospectus Supplement, Nov. 22, 2006, pp. 1-23, SEC Filing.

Citigroup Funding Inc. and Citigroup, Inc., "Safety First Trust Series 2006-1-7,775,000 Principal-Protected Trust Certificates," Prospectus Supplement, pp. 1-80, SEC Filing.

Citigroup Funding Inc. and Citigroup, Inc., "Safety First Trust Series 2007-1-7,633,800 Principal-Protected Trust Certificates," Rule 424(B)(2), pp. 1-141, SEC Filing.

Citigroup Funding Inc. and Citigroup, Inc., "Safety First Trust Series 2007-2-2,289,546 Principal-Protected Trust Certificates," Form 424B2, pp. 1-115, SEC Filing.

Barclays Capital, "$6,000,000 100% Principal Protected Notes due Sep. 1, 2011," Pricing Supplement, May 29, 2007, pp. PS-1-PS20, SEC Filing.

Barclays Capital, "$10,000,000,000 Medium-Term Notes, Series A," Prospectus Supplement to Prospectus, Sep. 21, 2005, Nov. 1, 2006, 97 Sheets, (Cover page, i-ii, S1-S94), SEC Filing.

Barclays Capital, "Debt Securities Preference Shares American Depositary Shares," Sep. 21, 2005, 57 Sheets, (Cover page, toc, pp. 1-55), SEC Filing.

SG Cowen Securities Corp., "U.S. S.E.C. Form N-2," SG Cowen Principal Protected Trust I, May 9, 2003, pp. 1-50, SEC Filing.

U.S. Appl. No. 11/803,592, filed May 14, 2007, Samson Koo et al.

Citigroup., "Safety First Trust Series 2007-3," Citigroup Funding Inc., Jun. 25, 2007, pp. 1-90, SEC Filing.

* cited by examiner

METHOD OF AND SYSTEM FOR PROTECTING AN INITIAL INVESTMENT VALUE OF AN INVESTMENT

RELATED APPLICATIONS

This application is a continuation of U.S. patent application Ser. No. 11/851,292 filed on Sep. 6, 2007, entitled Method Of Protecting An Initial Investment Value Of An Investment; which is a continuation-in-part of U.S. patent application Ser. No. 11/847,167, filed on Aug. 29, 2007, entitled Method Of Protecting An Initial Investment Value Of An Investment, the contents of which are incorporated by reference herein.

FIELD OF THE INVENTION

The present invention generally relates to systems and methods for ensuring a return on an investment, and in particular to systems and methods for protecting an initial investment value of an investment.

BACKGROUND OF THE INVENTION

As a means to make a financial product more attractive to customers, a financial institution may offer the financial product with some principal protection. Ideally, the financial product is offered with 100% principal protection. However, principal protection comes at a cost to the financial institution, since with such products the financial institution bears the risk of the principal falling in value. Upon maturity of a principal protected financial product, if the product is valued below the initial investment amount, the financial institution would be burdened with providing the difference to the seller.

Accordingly, there is a need for a method of providing a principal protected financial product that allows a financial institution offering the product to hedge the risk involved with guaranteeing the return of principal.

SUMMARY OF THE INVENTION

A method of protecting at least a portion of an initial investment value of an investment made by an investor according to an exemplary embodiment of the present invention comprises the steps of: providing a business entity; electing the business entity to be treated as a regulated investment company; holding positions using the business entity in a set of put-option based instruments having a first underlying reference and a set of call-option based instruments having a second underlying reference, the first underlying reference being the same as or substantially correlated to the second underlying reference, so that the sets of put-option based instruments and call-option based instruments provide the at least a portion of the initial investment value at maturity of the investment; and making available the at least a portion of the initial investment value to the investor upon the maturity of the investment.

A method of protecting at least a portion of an initial investment value of an investment made by an investor according to an exemplary embodiment of the present invention comprises the steps of: providing a business entity; electing the business entity to be treated as a regulated investment company; holding positions using the business entity in a first set of option-based instruments having a first underlying reference and a second set of option-based instruments having a second underlying reference, the first underlying reference being the same as or substantially correlated to the second underlying reference, so that the first set of option-based instruments and the second set of option-based instruments provide the at least a portion of the initial investment value at maturity of the investment; and making available the at least a portion of the initial investment value to the investor upon the maturity of the investment.

According to an exemplary embodiment of the present invention, a computer system for protecting at least a portion of an initial investment value of an investment made by an investor in a financial product offered by a business entity elected to be treated as a regulated investment company comprises: a memory that stores data relating to the investment; a computer-readable medium comprising: an option-based instrument calculator that determines values of a set of put-based option instruments having a first underlying reference and a set of call-based option instruments having a second underlying reference, the first underlying reference being the same as or substantially correlated to the second underlying reference; a hedging manager that generates a first set of instruction for holding positions using the business entity in the sets of put-based option instruments and call-based option instruments based on the values determined by the option-based instrument calculator, so that the sets of put-based option instruments and call-based option instruments provide the at least a portion of the initial investment value at maturity of the investment; and a processor that executes the first and second set of instructions.

According to an exemplary embodiment of the present invention, a computer readable medium has instructions executable on a computer processor for performing a method for protecting at least a portion of an initial investment value of an investment made by an investor, where the method comprises the steps of: providing a business entity; electing the business entity to be treated as a regulated investment company; holding positions using the business entity in a set of put-option based instruments having a first underlying reference and a set of call-option based instruments having a second underlying reference, the first underlying reference being the same as or substantially correlated to the second underlying reference, so that the sets of put-option based instruments and call-option based instruments provide the at least a portion of the initial investment value at maturity of the investment; and making available the at least a portion of the initial investment value to the investor upon the maturity of the investment.

In at least one embodiment, the regulated investment company is of a type selected from the following list of regulated investment company types: unit investment trust, close-ended fund and open-ended fund.

In at least one embodiment, the set of put-option based instruments and the set of call-option based instruments comprise at least one option instrument.

In at least one embodiment, the call-option based instruments are issued by the same entity as the put-option based instruments.

In at least one embodiment, the call-option based instruments are issued by an entity that is different from an entity that issues the put-option based instruments.

In at least one embodiment, the calls and puts are each of a type selected from the following list of call and put types: registered warrants, over-the-counter options, exchange traded options, forward contracts, exchange traded market-linked notes, publicly registered market-linked notes, other types of market-linked notes, exempt securities, certificates of deposit, and private placement instruments.

In at least one embodiment, the business entity holds a diverse set of stocks and securities.

In at least one embodiment, the diverse set of stocks and securities are held in the form of options or a financial instrument the value of which varies based on an index calculated based on the diverse set of stocks and securities.

In at least one embodiment, the business entity holds a long position in the set of put-option based instruments and a long position in the set of call-option based instruments.

In at least one embodiment, the business entity holds a short position in the set of put-option based instruments and a short position in the set of call-option based instruments.

In at least one embodiment, the business entity holds a long position in the set of put-option based instruments and a short position in the set of call-option based instruments.

In at least one embodiment, the business entity holds a short position in the set of put-option based instruments and a long position in the set of call-option based instruments.

In at least one embodiment, the first and second sets of option-based instruments are made up of call-option based instruments, put-option based instruments, or combinations of call-option based instruments and put-option based instruments.

In at least one embodiment, the positions are long positions, short positions, or combinations of long and short positions.

In at least one embodiment, the at least a portion of the initial investment value is at least 50% of the initial investment value.

In at least one embodiment, the set of option based instruments has a total notional amount of at least 50% of the at least a portion of the initial investment value.

These and other features of this invention are described in, or are apparent from, the following detailed description of various exemplary embodiments of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

By using sets of put-option based instruments and call-option based instruments, the present invention is able to protect an initial investment value while also potentially taking advantage of the potential long-term capital gain treatment provided by option instruments. In particular, according to the present invention, a business entity is elected to be treated as a regulated investment corporation (RIC), and positions in sets of put and call-option based instruments are held by the RIC to protect at least a portion of the initial investment. In order for a business entity to qualify as a RIC, the business entity must meet certain requirements as provided under Federal law and known in the art, such as 90% minimum distribution of interest and dividends received on investments less expenses, 90% distribution of capital gain net income and holding of a diverse set of stocks and securities. Preferably, the sets of put and call-option based instruments have underlying references that are the same as or substantially correlated to one another. For the purposes of the present disclosure, the term "put-option based instrument" may be defined as a financial instrument having a key attribute that is substantially similar to a put option. Similarly, the term "call-option based instrument" may be defined as a financial instrument having a key attribute that is substantially similar to a call option. As an example, a put-option based instrument according to the present invention may be made up of a combination of put options and call options, with the aggregate effect of the instrument having significantly similar economics to those of a put option. Similarly, a call-option based instrument according to the present invention may be made up of a combination of put options and call options, with the aggregate effect of the instrument having significantly similar economics to those of a call option.

Figure 1:
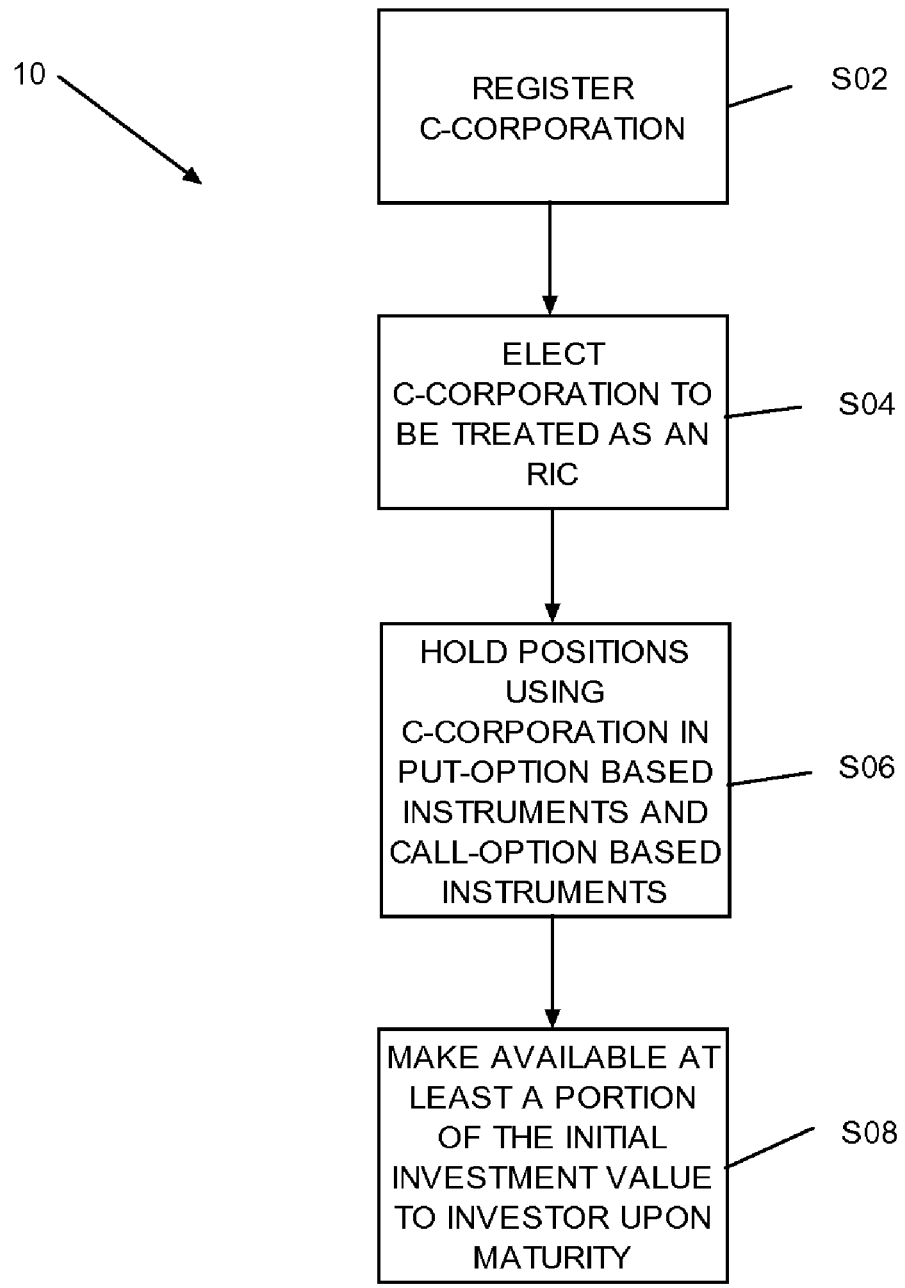
FIG. 1 is a flowchart showing a method of protecting an initial investment value of an investment according to an exemplary embodiment of the present invention.

FIG. 1 is a flowchart showing a method, generally designated by reference number 10, of protecting an initial investment value of an investment according to an exemplary embodiment of the present invention. In step S02 of the method 10, an investment management company is provided as a C-corporation or some other form of business entity capable of being registered as a RIC. For example, the business entity may be in the form of a trust.

In step S04 of the method 10, the investment management company is elected to be treated as a RIC. The RIC is then preferably made to constitute a unit investment trust (UIT), close-ended fund or an open-ended fund offering a portfolio of stocks and securities to investors. For example, the RIC may offer as a reference asset a basket of stocks/and or securities held in the form of options or an index calculated based on the stocks and securities. As a further example, the reference asset may be a basket made up of weighted equity indices, such as the S&P 500® Index, Dow Jones EURO STOXX 50® Index, the Nikkei 225™ Index, the S&P/ASX 200 Index, the FTSE/Xinhua China 25™ Index, and the MSCI Taiwan Index, to name a few.

In step S06 of the method 10, the RIC enters into hedging transactions in order to hedge some or all of its exposure and to protect at least a portion of the principal investment, and preferably all of the principal investment. In this regard, the RIC may take or modify positions in a set of put-option based instruments having a first underlying reference and a set of call-option based instruments having a second underlying reference. Preferably, the first underlying reference is the same as or substantially correlated to the second underlying reference. For example, the underlying reference may be the reference asset offered by the RIC, substantially correlated to the reference asset, or unrelated to the reference asset. In an exemplary embodiment of the present invention, at least 50% of the initial investment value is protected by holding positions in option-based instruments having a total notional amount equal to at least 50% of the protected amount of the initial investment value.

The put-option and call-option based instruments in which the RIC holds positions may be based on any known call or put types, such as, for example, registered warrants, over-the-counter options, exchange traded options, forward contracts, exchange traded market-linked notes, publicly registered market-linked notes, other types of market-linked notes, exempt securities (i.e., securities that are exempt from registration under the Federal securities law), certificates of deposit, and private placement instruments, to name a few. Also, the calls and puts may have the same issuer or different issuers from one another.

The RIC may hold any variation of long and short positions in the put-option and call-option based instruments. For example, the RIC may hold a long position in the set of put-option based instruments, a short position in the set of put-option based instruments, a long position in the set of call-option based instruments, or a short position in the set of call-option based instruments. Further, each option-based instrument may be constructed by combining long and/or short positions of calls and/or puts, where the combination is selected to achieve the desired aggregate effect of the option-based instrument. Some examples of positions which may be held by the RIC are provided below:

Example 1

The RIC purchases a call option on Underlying Reference (e.g., the S&P 500 Index), and also purchases a put option on Underlying Reference A or on an underlying reference substantially correlated to Underlying Reference A. If the underlying reference is a broad-based index, such as the S&P 500 Index, the diversification requirement of RICs are met.

Example 2

The RIC purchases Basket B, which is a basket of stocks or securities. The RIC then: (i) purchases a put option on Basket B or on an underlying reference substantially correlated to Basket B (e.g., an Underlying Reference C); (ii) sells a call option on Basket B or on an underlying reference substantially correlated to Basket B (e.g., an Underlying Reference C or another substantially correlated index); and (iii) buys a call option on Underlying Reference D, an underlying reference substantially correlated to Basket B, or on an Underlying Reference E, which is not the same as or substantially correlated to Basket B.

Example 3

The RIC purchases Basket B, which is a basket of stocks or securities. The RIC then sells a forward contract on Basket B or on an underlying reference substantially correlated to Basket B, and purchases a call option on Basket B, or on an underlying reference substantially correlated to Basket B, or on Underlying Reference E, which is not the same as or substantially correlated to Basket B.

Example 4

The RIC purchases Basket B, which is a basket of stocks or securities. The RIC then sells a call option on Basket B or on an underlying reference substantially correlated to Basket B, and purchases a call option on Underlying Reference C, an underlying reference substantially correlated to Basket B, or on Underlying Reference E, which is not the same as or substantially correlated to Basket B.

Example 5

The RIC: (i) purchases a first call option on Underlying Reference C; (ii) sells a second call option with a higher strike price than the first call option on Underlying Reference C or on an underlying reference substantially correlated to the Underlying Reference C; (iii) sells a put option on Underlying Reference C or on an underlying reference substantially correlated to Underlying Reference C; and (iv) purchases a third call option on Underlying Reference D, an underlying reference substantially correlated to Underlying Reference C, or on Underlying Reference E that is not the same as or substantially correlated to Underlying Reference C.

Example 6

The RIC purchases a Financial Instrument A and a Financial Instrument B, where Financial Instrument A has the economics of (I) plus (II) plus (III), and Financial Instrument B has the economics of (i) plus (ii), where:

(I) is a long position of a call option on Underlying Reference C;
(II) is a short position of a call option on Underlying Reference C or on an underlying reference substantially correlated to Underlying Reference C;
(III) is a long position of a call option on Underlying Reference C or on an underlying reference substantially correlated to Underlying Reference C or on Underlying Reference D that is not the same as or substantially correlated to Underlying Reference C;
(i) is a long position of a put option on Underlying Reference C or on an underlying reference substantially correlated to Underlying Reference C; and
(ii) is a short position on Underlying Reference C or on an underlying reference substantially correlated to Underlying Reference C.

Example 7

The RIC purchases a Financial Instrument A and a Financial Instrument B, where Financial Instrument A has the economics of (I) plus (II) plus (III), and Financial Instrument B has the economics of (i) plus (ii), where:

(I) is a long position of a call option on Underlying Reference C;
(II) is a short position of a call option on Underlying Reference C or on an underlying reference substantially correlated to Underlying Reference C;
(III) is a long position of a put option on Underlying Reference C or on an underlying reference substantially correlated to Underlying Reference C or on Underlying Reference D that is not the same as or substantially correlated to Underlying Reference C;
(i) is a long position of a put option on Underlying Reference C or on an underlying reference substantially correlated to Underlying Reference C;
(ii) is a short position on Underlying Reference C or on an underlying reference substantially correlated to Underlying Reference C.

In step S08 of the method 10, the RIC makes available to the investor at least some portion of the invested principal, and preferably at least 100% of the invested principal. Additional funds may also be made available to the investor depending on the overall performance of the investment.

The above-described method provides a mechanism by which an investment management company or similar entity in the form of an RIC may guarantee return of a principal amount of an investment to the investor, without substantial risk to the investment management company. As part of an agreement between the RIC and the investor, such guarantee of return of the principal amount may apply only if the investor maintains the investment to maturity.

Figure 2:
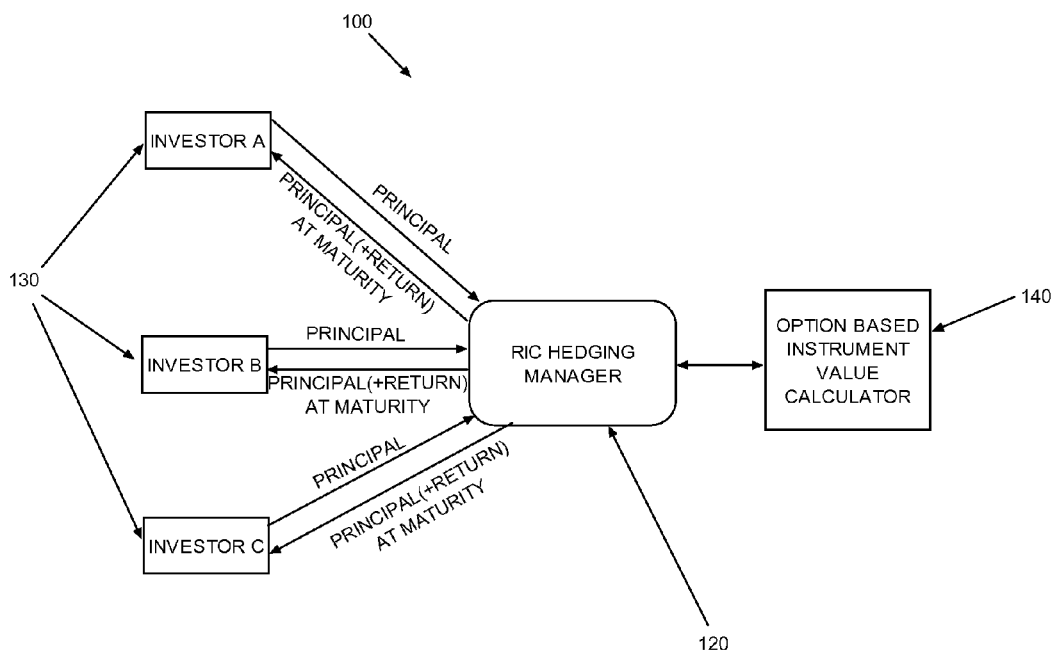
FIG. 2 is a block diagram of a system for protecting an initial investment value of an investment according to an exemplary embodiment of the present invention.

FIG. 2 is a block diagram of a system, generally designated by reference number 100, for protecting an initial investment value of an investment according to an exemplary embodiment of the present invention. The system 100 includes an RIC hedging manager 120, one or more investors 130, and an option-based instrument value calculator 140. Although only three investor are shown in FIG. 2, it should be appreciated that any number of investors may be involved in the system 100, and further the investors 130 may be individual or corporate entities.

The option-based instrument value calculator 140 determines the values of option-based instruments that are used by the RIC to hedge the risk associated with guaranteeing return of a least a portion of the value of the initial investment made by the investors 130. Based on the values determined by the option-based instrument value calculator 140, the RIC hedging manager 120 may determine the appropriate sets of put-option and call-option based instruments in which to hold positions so as to achieve protection of at least a portion of the initial investment value. For example, the RIC hedging manager 120 may determine whether to hold long and/or short positions in an appropriate amount of option-based instruments and the terms of each option-based instrument to achieve the desired result. In this regard, as discussed above, the RIC hedging manager 120 may take long positions, short positions, or combinations of short and long positions in sets of put-option and/or call-option based instruments. Also, as discussed above, the put-option and call-option based instruments in which the RIC holds positions may be based on any known call or put types, such as, for example, registered warrants, over-the-counter options, exchange traded options, forward contracts, exchange traded market-linked notes, publicly registered market-linked notes, other types of market-linked notes, exempt securities (i.e., securities that are exempt from registration under the Federal securities law), certificates of deposit, and private placement instruments. Also, the calls and puts may have the same issuer or different issuers from one another, and may have the same, substantially correlated or different underlying references.

The RIC hedging manager 120 may use an algorithm that optimizes hedging while protecting at least a portion of the initial investment. Such an algorithm may be based on Formula 1 below:

$$\text{Value of Protected Portion of Initial Investment} = \text{Fees Paid by Investor} + \text{Value of Option-Based Instruments} \quad (1)$$

In exemplary embodiments of the invention in which combinations of different types of option-based instruments are used, the algorithm may be based on Formula 2 below:

$$\text{Value of Protected Portion of Initial Investment} = \text{Fee Paid by Investor} + \text{Value of Call-Option Based Instruments} + \text{Value of Put-Option Based Instruments} \quad (2)$$

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of protecting at least a portion of an initial investment value of an investment made by one or more investors, comprising the steps of:
   (a) determining using an option-based instrument calculator:
      (i) a first value of a first set of put option-based instruments at initial investment in the first set of put option-based instruments, the first set of put option-based instruments having a first underlying reference;
      (ii) a second value of a first set of call option-based instruments at initial investment in the first set of call option-based instruments, the first set of call option-based instruments having a second underlying reference, the first underlying reference being the same as or substantially correlated to the second underlying reference; and
      (iii) a third value of a second set of option-based instruments at initial investment in the second set of option-based instruments, the second set of option-based instruments having a third underlying reference;
         so that the sum of the first value, the second value, and the third value is less than the initial investment value;
   (b) holding positions using a regulated investment company in the first set of put option-based instruments, the first set of call option-based instruments, and the second set of option-based instruments, so that the first set of put option-based instruments and the first set of call option-based instruments provide the at least a portion of the initial investment value at maturity of the investment; and
   (c) making available the at least a portion of the initial investment value to the one or more investors upon the maturity of the investment.

2. The method of claim 1, wherein the regulated investment company is of a type selected from the following list of regulated investment company types: unit investment trust, close-ended fund and open-ended fund.

3. The method of claim 1, wherein the first set of put option-based instruments and the second set of option-based instruments are issued by the same entity.

4. The method of claim 1, wherein the first set of call option-based instruments and the second set of option-based instruments are issued by the same entity.

5. The method of claim 1, wherein the first set of call option-based instruments are issued by an entity that is different from an entity that issues the first set of put option-based instruments.

6. The method of claim 1, wherein the first set of call option-based instruments are issued by an entity that is different from an entity that issues the second set of option-based instruments.

7. The method of claim 1, wherein the first set of put option-based instruments are issued by an entity that is different from an entity that issues the second set of option-based instruments.

8. The method of claim 1, wherein the calls and puts are each of a type selected from the following list of call and put types: registered warrants, over-the-counter options, exchange traded options, forward contracts, exchange traded market-linked notes, publicly registered market-linked notes, other types of market-linked notes, exempt securities, certificates of deposit, and private placement instruments.

9. The method of claim 1, wherein the regulated investment company holds a diverse set of stocks and securities.

10. The method of claim 9, wherein the diverse set of stocks and securities are held in the form of options or a financial instrument the value of which varies based on an index calculated based on the diverse set of stocks and securities.

11. The method of claim 1, wherein the regulated investment company holds a long position in the first set of put option-based instruments and a long position in the first set of call option-based instruments.

12. The method of claim 1, wherein the regulated investment company holds a short position in the first set of put option-based instruments and a short position in the first set of call option-based instruments.

13. The method of claim 1, wherein the regulated investment company holds a long position in the first set of put option-based instruments and a short position in the first set of call option-based instruments.

14. The method of claim 1, wherein the regulated investment company holds a short position in the first set of put option-based instruments and a long position in the first set of call option-based instruments.

15. A computer system for protecting at least a portion of an initial investment value of an investment made by an investor in a financial product offered by a regulated investment company comprising:
   (a) a processor;
   (b) a computer-readable storage medium that stores data relating to the investment which is operatively connected to the processor;
   (c) an option-based instrument calculator that determines values of:
      (i) a first value of a first set of put option-based instruments at initial investment in the first set of put option-based instruments, the first set of put option-based instruments having a first underlying reference;
      (ii) a second value of a first set of call option-based instruments at initial investment in the first set of call option-based instruments, the first set of call option-based instruments having a second underlying reference, the first underlying reference being the same as or substantially correlated to the second underlying reference; and
      (iii) a third value of a second set of option-based instruments at initial investment in the second set of option-based instruments, the second set of option-based instruments having a third underlying reference;
      so that the sum of the first value, the second value, and the third value is less than the initial investment value; and
   (d) a hedging manager that generates a set of instructions to be executed on the processor for holding positions using the regulated investment company in the first set of put option-based instruments, the first set of call option-based instruments and the second set of option-based instruments, so that the first set of put option-based instruments and the first set of call option-based instruments provide the at least a portion of the initial investment value at maturity of the investment.

16. An apparatus comprising:
   (a) a processor;
   (b) a computer-readable storage medium that stores data relating to an investment, the computer-readable storage medium operatively connected to the processor, wherein the data comprises:
      (i) a first value of a first set of put option-based instruments at initial investment in the first set of put option-based instruments, the first set of put option-based instruments having a first underlying reference;
      (ii) a second value of a first set of call option-based instruments at initial investment in the first set of call option-based instruments, the first set of call option-based instruments having a second underlying reference, the first underlying reference being the same as or substantially correlated to the second underlying reference; and
      (iii) a third value of a second set of option-based instruments at initial investment in the second set of option-based instruments, the second set of option-based instruments having a third underlying reference;
      wherein the sum of the first value, the second value, and the third value is less than an initial investment value; and
      (iv) positions held by a regulated investment company in the first set of call option-based instruments, the first set of put option-based instruments and the second set of option-based instruments, so that the first set of put option-based instruments and the first set of call option-based instruments provide at least a portion of the initial investment value at maturity of the investment.

* * * * *